US011396277B2

(12) United States Patent
Liesener et al.

(10) Patent No.: US 11,396,277 B2
(45) Date of Patent: Jul. 26, 2022

(54) METHOD FOR OPERATING A MOTOR VEHICLE HAVING AT LEAST ONE EXTERIOR CAMERA AND MOTOR VEHICLE HAVING AT LEAST ONE EXTERIOR CAMERA

(71) Applicant: MOTHERSON INNOVATIONS COMPANY LIMITED, London (GB)

(72) Inventors: Alf Liesener, Stuttgart (DE); Stefanie Göttlicher, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 285 days.

(21) Appl. No.: 16/646,774

(22) PCT Filed: Aug. 31, 2018

(86) PCT No.: PCT/EP2018/073465
§ 371 (c)(1),
(2) Date: Mar. 12, 2020

(87) PCT Pub. No.: WO2019/052837
PCT Pub. Date: Mar. 21, 2019

(65) Prior Publication Data
US 2020/0377060 A1 Dec. 3, 2020

(30) Foreign Application Priority Data

Sep. 14, 2017 (DE) .................... 10 2017 121 376.7

(51) Int. Cl.
*H04N 5/44* (2011.01)
*B60S 1/62* (2006.01)
(Continued)

(52) U.S. Cl.
CPC .................... *B60S 1/62* (2013.01); *B60R 1/12* (2013.01); *B60R 25/01* (2013.01); *B60R 25/104* (2013.01);
(Continued)

(58) Field of Classification Search
CPC .... B60S 1/62; B60S 1/023; B60S 1/56; B60S 1/485; B60R 1/12; B60R 25/01;
(Continued)

(56) References Cited

U.S. PATENT DOCUMENTS 9,539,988 B2 *  1/2017  Hsiao ................... H04N 5/2171
10,189,429 B2 *  1/2019  Krishnan ................. B60S 1/56
(Continued)

FOREIGN PATENT DOCUMENTS

DE      102010046396 A1      3/2012
DE      102015209976 A1     12/2016
(Continued)

OTHER PUBLICATIONS

International Search Report dated Nov. 17, 2018 of International application No. PCT/EP2018/073465.
(Continued)

*Primary Examiner* — Munear T Akki
(74) *Attorney, Agent, or Firm* — Jones Day

(57) ABSTRACT

A method for operating a motor vehicle with at least one exterior camera includes detecting whether the motor vehicle is put into operation before a driver gets into the motor vehicle, determining whether there is any contamination of the at least one exterior camera, in particular of a lens and/or a cover of the exterior camera, and outputting at least one signal in the event of certain contamination and detected start-up. A motor vehicle includes a control or regulating device designed to carry out the method.

15 Claims, 2 Drawing Sheets

(51) Int. Cl.
*B60R 1/12* (2006.01)
*B60R 25/01* (2013.01)
*B60R 25/104* (2013.01)
*B60R 25/24* (2013.01)
*B60R 25/30* (2013.01)
*B60S 1/02* (2006.01)
*B60R 25/10* (2013.01)

(52) U.S. Cl.
CPC ............ *B60R 25/24* (2013.01); *B60R 25/305* (2013.01); *B60S 1/023* (2013.01); *B60R 2001/1215* (2013.01); *B60R 2025/1013* (2013.01)

(58) Field of Classification Search
CPC ..... B60R 25/104; B60R 25/24; B60R 25/305; B60R 2001/1215; B60R 2025/1013; B60R 2001/1253; G08B 21/24; G08B 21/02; G08B 7/06
See application file for complete search history.

(56) References Cited

U.S. PATENT DOCUMENTS

| | | | |
|---|---|---|---|
| 10,549,723 B2* | 2/2020 | Baldovino | G01N 21/958 |
| 10,604,120 B2* | 3/2020 | Newman | G02B 27/0006 |
| 10,759,355 B2* | 9/2020 | Lin | H04N 5/2252 |
| 2014/0104426 A1* | 4/2014 | Boegel | B60R 1/10 348/148 |
| 2014/0232869 A1* | 8/2014 | May | G06T 7/70 348/148 |
| 2016/0364620 A1* | 12/2016 | Akiyama | H04N 7/188 |
| 2018/0009418 A1* | 1/2018 | Newman | B08B 3/02 |
| 2019/0015536 A1* | 1/2019 | Dellock | A61L 2/26 |
| 2022/0073035 A1* | 3/2022 | Onoda | B60Q 1/0023 |

FOREIGN PATENT DOCUMENTS

| | | |
|---|---|---|
| EP | 1901116 A2 | 3/2008 |
| EP | 2682315 A1 | 1/2014 |
| EP | 3166302 A1 | 5/2017 |
| JP | 2012106557 A | 6/2012 |
| WO | WO 2016/116231 A1 | 7/2016 |

OTHER PUBLICATIONS

Written Opinion dated Nov. 17, 2018 of International application No. PCT/EP2018/073465.

* cited by examiner

METHOD FOR OPERATING A MOTOR VEHICLE HAVING AT LEAST ONE EXTERIOR CAMERA AND MOTOR VEHICLE HAVING AT LEAST ONE EXTERIOR CAMERA

CROSS-REFERENCE TO RELATED APPLICATIONS

This application is a National Stage Entry of International Patent Application No. PCT/EP2018/073465, filed Aug. 31, 2018, which claims the benefit of foreign priority to German Patent Application No. DE 10 2017 121 376.7, filed Sep. 14, 2017, each of which is hereby incorporated by reference in its entirety for all purposes.

BACKGROUND

1. Field of the Invention

The present disclosure relates to a method for operating a motor vehicle with at least one exterior camera and a motor vehicle with at least one exterior camera and with a control or regulating device which is designed to carry out such a method.

2. Related Art

Exterior cameras are increasingly being used in modern motor vehicles to provide a driver of the vehicle with additional visual information about the vehicle's environment or to serve as sources of information for driver assistance systems. These are, for example, rear-view cameras, rear-view cameras, which can also replace an exterior rear-view mirror of the motor vehicle if necessary, front-view cameras as a data source for driver assistance systems and the like. Such cameras can have light sources such as LEDs in the camera housing.

A rear view device for a motor vehicle provides an image of the rear part of the motor vehicle which at least meets the legal requirements and belongs to a subgroup of devices for indirect vision. These provide images and views of objects that are not in the driver's direct field of view, i.e. in opposite directions, left, right, below and/or above the driver's line of vision. In particular, the driver's view may not be fully satisfactory in the direction of vision. For example, obstructions to vision may be caused by parts of the driver's own vehicle, such as parts of the bodywork, in particular the A-pillar, the roof structure and/or the bonnet, and obstructions to vision by other vehicles and/or objects outside the vehicle, which may obstruct vision in such a way that the driver cannot fully satisfactorily grasp a driving situation or can only grasp it incompletely. It is also possible that the driver is not able to perceive the situation present in or away from the line of vision in the way that would be necessary to control the vehicle according to the situation. Therefore, a rear-view device may also be designed to process the information according to the driver's abilities in order to enable him to grasp the situation in the best possible way.

Various functions and devices may be incorporated in and/or controlled by rear view devices, including in particular cameras. Particularly useful are functions and devices to improve, extend and/or maintain the functionality of the rear view device under normal or extreme conditions. This may include heating and/or cooling devices, cleaning means such as wipers, liquid and/or gaseous sprays, actuator means for moving the rear view device or parts thereof, such as a display, a camera system and/or parts of a camera system comprising for example lenses, filters, light sources, adaptive optics such as deformable mirrors, sensors and/or mirrors, and/or actuator means for inducing movements of other objects, for example parts of the vehicle and/or objects surrounding the vehicle.

Furthermore, the retro-reflection device may comprise linear guides and/or rotating wheels, such as a filter wheel, for the replacement of optical elements, for example comprising lenses, mirrors, light sources, sensors, adaptive optics such as deformable mirrors and/or filters.

Rear view devices may incorporate other devices and/or control other devices by means of rear view devices, such as any type of light module comprising an external light module, an internal light module, a front light, a rear light, a front fog lamp, a stop lamp, an accelerator lamp, a flashing light, a logo light, an apron light, a ground light, a puddle light, a flashing light, a navigation light, a position light, an emergency light, a headlamp, a green light, a red light, a warning light, a flashing light module, a proximity light, a search light, an information light, an indicator and/or the like Other examples of functions and devices integrated into and/or controlled by rear view devices may include a fatigue detection system, a microsleep detection system, a distance and/or speed determination system, such as a LIDAR (light detection and distance sensing) system, a blind spot indication system, a lane change assistance system, a navigation assistance system, a tracking assistance system, a human-machine interaction system, a machine-machine interaction system, an emergency and precautionary measures assistance system, such as an accident avoidance assistance system, a countermeasures assistance system a brake assist system, a steering assist system, an acceleration assist system, an escape assist system comprising for example an ejection seat system, a direction indicator, a blind spot indicator, an approach system, an emergency braking system, a charge status indicator, a vehicle mode system comprising for example a sport mode system, an economy mode system, an autonomous driving mode system, a sleep mode system and/or an anti-theft system, a vehicle locked indication system, a vehicle stolen display, a warning signal system, a temperature indicator system, a weather indication system, a traffic light signal system, a fuel status system and/or any combination thereof.

Illumination devices for rear view devices and/or light guides therefor are contained in German patent application No 102012108488, German patent application No 102012104529, German patent application No 102012107833, German patent application No 102012107834, European patent No 2738043, European patent No 2947378, international patent application No 2015/173695, European patent application No. 3045944, U.S. patent application Ser. No. 15/228,566, U.S. patent application Ser. No. 15/000,733, international patent application No. 2016/147154, U.S. patent application Ser. No. 15/256,532, German patent application No. 102015115555, European patent application No. 3144183, described by the applicant.

In particular, a camera module may have a large number of different optical elements, including a large number of different sensors and light sources, and housing parts. The housing of a camera module may be made of plastic, metal, glass, another suitable material and/or any combination thereof and may be used in combination with the techniques described below to change or modify the properties of the material or the surface of the material. Housings are disclosed, for example, in the German patent application No. 102016108247.3.

The camera may include, for example, CCD or CMOS or light field sensors as described in German patent application No. 102011053999 and U.S. Pat. No. 6,703,925. It is also possible to reserve an area of the sensor for different purposes, for example to detect a test beam, as disclosed in U.S. Pat. No. 8,031,224.

The optical elements may be moulded or designed from any type of glass or other suitable material. Glass is used here in the sense of a non-crystalline amorphous solid that exhibits a glass transition when heated in the direction of the liquid state. It includes for example the group of polymer glasses, metal glasses, silica glasses, but any other suitable material showing the glass transition can also be used. The glass can be either flat, wedge-shaped, rectangular, cylindrical, spherical, conical, elliptical and/or circular, as described for example in German patent application No 102016108247.3 and German patent application No 102011103200, or have a shape according to different needs or lens types. As non-restrictive examples, camera modules may be equipped with lenses, such as a wide-angle or fisheye lens, which is capable of providing peripheral images, as described in U.S. patent application Ser. No. 15/281,780 and the U.S. patent application Ser. No. 13/090,127, a Fresnel lens or microlenses as described in the German patent application No. 102011053999, or a TIR (total internal reflection lens) as described in the U.S. Pat. No. 8,740,427. Another type of optical elements known to be used in camera modules are optical fibres, in particular in the form of fibre bundles and preferably in the form of fibre bundles with an optical head, as described for example in U.S. patent application Ser. No. 09/771,140. Various methods can be used to produce such optical elements, such as the method described in U.S. Pat. No. 8,460,060. The optical elements can be transparent, as described for example in U.S. Pat. No. 8,031,224, German Patent Application No. 102016108247.3 and U.S. patent application Ser. No. 13/242,829. But the optical elements can also be semi-transparent, as described in U.S. patent application Ser. No. 09/771,140 and U.S. patent application Ser. No. 13/090,127. Furthermore, the optical elements can be fully or partially coated with different types of coatings to achieve different effects, such as anti-reflection coatings, see U.S. Pat. No. 8,031,224, chromium-based reflective coatings, see U.S. Pat. No. 9,181,616, and other coatings, such as for polymeric substrates described in U.S. patent application Ser. No. 14/936,024 and U.S. patent application Ser. No. 15/124,310. Preferably, the optical elements are made of a scratch-resistant material, as described for example in the German patent application No. 102016108247.3. The optical elements may have outcoupling structures at specific locations on the optical elements, and an optical film, for example an extrusion film, and a shaped coating may be applied as described in German patent application No 102011103200. A coating for spectral and stress control is described in the U.S. patent application Ser. No. 15/124,310. Various filters can be integrated into the optical elements, such as gray filters or polarization filters, which are described in the U.S. patent application Ser. No. 14/809,509. Electrochromic substrates, polymer electrolytes and other charge-conducting media may be included for the optical elements based on the descriptions as disclosed in European Patent Application No. 08103179.1, European Patent No. 2202826, U.S. Pat. Nos. 7,999,992 and 8,537,451.

The camera module may also be equipped with light intensity control devices as described in U.S. patent application Ser. No. 14/809,509 and may have light level amplifier tubes as described in U.S. patent application Ser. No. 09/771,140. The electrochromic substrates and devices used in European Patent Application No. 08103179.1, European Patent No. 2202826, U.S. Pat. Nos. 7,999,992 and 8,537,451 can also be used for this purpose, as can a transflector for transmitting or reflecting light on the basis of a corresponding input signal, as described in German Patent Application No. 102016106126.3.

The camera module or a cover adapted to the camera module can be moved with different actuators, drives and/or a flexible track, as described for example in the German application no. 102016108247.3 and the U.S. patent application Ser. No. 15/281,780. Furthermore, the camera module can also include cleaning elements to clean the optical element that faces outwards and is exposed to the environment. The cleaning element may include, for example, wipers, brushes, lips, nozzles, fans and similar elements as described in European Patent Application No. 14165197.6, U.S. patent application Ser. No. 15/281,780, German Patent Application No. 102016108247.3, European Patent Application No. 13163677.1, European Patent Application No. 15173201.3 and European Patent No. 1673260. The cleaning devices are not limited in their composition and may include, for example, any fabric, elastomer, sponge, brush or combination thereof. Special wiper elements comprising wiper arms, wiper blades, wiping cloths, wiping fabrics and combinations thereof are described in European patent application No 14165197.6. For example, a wiper element can be controlled by the method described in European patent application No. 130164250.6. A reservoir for holding a cleaning fluid, as described in the European patent application No. 14165197.6, may be attached to or integrated into the camera module to supply the cleaning fluid to the optical elements of the camera module.

Various methods can be used to detect dirt or other turbidity that prevents or deteriorates the functioning of the camera module as described in U.S. Pat. No. 8,395,514, European Patent No. 1328141, and U.S. Pat. No. 8,031,224. Light sources can also be built or integrated into the camera module to increase the visibility of surrounding objects, measure distances and directions and detect dirt, as described in U.S. Pat. No. 8,031,224, U.S. Patent Application No. 62/470,658 and U.S. patent application Ser. No. 09/771,140.

It is known to provide heating devices for such cameras or protective glasses. For this purpose, for example, heating foils are glued to the protective glass or laminated with it. Such a solution is costly to produce and has only a low heating power due to the low thermal mass of such a heating foil. Various heating means such as heating coils, heating devices integrated into the lens holder or mount, or other heating elements can be used to prevent condensation and icing on the surface of optical elements, as in German patent application No. 102016108247.3 and U.S. patent application No. 62/470,658.

Watertight seals against weathering as well as against the influence of washing processes with detergents, solvents and high-pressure cleaners can be used on the housing of the camera module, as described for example in the U.S. patent application Ser. No. 13/090,127. Alternatively, the housing can be made of a body consisting of plastic and conductive material, the conductive material being distributed in the plastic material to form a conductive mass to allow a power source, preferably a DC voltage source, to connect to the body via at least two electrodes and to heat the body accordingly. A conductive track may be embedded in plastic parts of the camera module as described in European Patent No. 1328141 and U.S. Pat. No. 7,083,311.

If a lens or protective glazing of an exterior camera becomes contaminated, a driver or driver assistance system can no longer be provided with sufficiently good visual information to ensure safe operation of the motor vehicle. Therefore, such contamination must be detected and reported to the driver. From DE 10 2015 217 049 A1, for example, a procedure is therefore known which checks an exterior camera for contamination and, if contamination is present, sends a message to the driver of the motor vehicle. In known procedures of this kind, this information is usually transmitted to the driver via a display on a dashboard of the motor vehicle. The driver therefore only receives the information when he is already in the vehicle and has prepared for the start of the journey. However, this can lead to the driver refraining from getting out of the vehicle and cleaning the camera out of convenience, so that the journey is started under poorer safety conditions.

SUMMARY

In an aspect, a method includes recognizing whether the motor vehicle is to be put into operation, in particular before a driver gets into the motor vehicle, determining whether there is any contamination of the at least one exterior camera, in particular of a lens and/or a cover of the exterior camera, and emmitting at least one signal in the event of certain contamination and detected start-up.

It may be provided that operating an unlocking device or access control device of the motor vehicle, touching the motor vehicle, especially a door handle of the motor vehicle, preheating or defrosting of at least part of the motor vehicle, folding out and/or extending a rear view device, preferably comprising at least one exterior camera, expiration of a certain period of time, especially since the last cleaning of at least one exterior camera, consumption of a certain amount of fuel of the motor vehicle, especially since the last cleaning of at least one exterior camera, detection of a certain driving distance of the motor vehicle, especially since the last cleaning of the at least one exterior camera, and/or recording of certain weather conditions, especially since the last cleaning of at least one exterior camera, the contamination determination is triggered automatically or the value of a previously performed contamination determination is read out of a memory.

It may also be provided that at least one degree of contamination is determined during the contamination determination, in particular by comparison with stored data, preferably a plurality of different degrees of contamination.

It is further proposed that the at least one signal comprises a visual, acoustic and/or vibration signal, whereby preferably the at least one signal can be selected, changed and/or stored.

A method can also be characterized by controlling of a cleaning device of the at least one exterior camera in case of certain contamination and recognized start-up and/or depending on at least one signal.

Furthermore, it may be provided that at least one function of the motor vehicle, in particular opening a door and/or driving off, is blocked in case of certain contamination and detected start-up and/or depending on the at least one signal.

It may also be possible to control of a movement device of the at least one exterior camera in case of certain contamination and detected start-up and/or depending on the at least one signal.

A signal can be assigned to each specific degree of contamination, whereby preferably different signals differ in regard to their intensity, frequency, timing, length and/or their place of dispatch.

It is proposed that at least one first signal is output via at least one external display means of the motor vehicle, and/or at least one second signal is output via an operating device for the unlocking device or access control device, and/or at least one third signal is output via a mobile telephone device and/or a smartphone.

A method may further be characterized in that at least a fourth signal is generated, in particular upon detection of a lack of cleaning liquid of the cleaning device and/or damage to at least part of the cleaning device.

In a method for operating a motor vehicle with at least one exterior camera, for example in the case of one (or more) measure(s) for putting the motor vehicle into operation and before a driver gets into the motor vehicle, a check is carried out to determine whether the at least one exterior camera is contaminated, and if contamination of the at least one exterior camera is present, a signal is transmitted to the driver of the motor vehicle which prompts him to clean the at least one exterior camera.

This means that the driver is informed of any contamination of the at least one exterior camera before he takes his seat in the vehicle, which makes it easier for him to clean the at least one exterior camera immediately. Since it is therefore not necessary for the driver to get out of the vehicle again if contamination is detected, such a procedure also ensures a particularly high level of comfort in using the vehicle and thus also motivates the driver to reliably establish driving safety before starting the journey.

Where appropriate, automatic cleaning systems for at least one exterior camera may also be dispensed with in the application of the method, so that the manufacturing costs and weight of a motor vehicle designed to carry out the method are particularly low. However, the procedure may be applied in the same way where such automatic cleaning systems are provided for, for example to inform the driver when the contamination is beyond the cleaning capabilities of these cleaning systems.

Checking for contamination can include, for example, detecting contamination by analyzing an image captured by the camera. This can be done directly during or after the commissioning measure, i.e. before the start of the journey. However, it is also possible that such a contamination detection is also carried out during operation. In this case a corresponding information can be stored in a memory. Checking whether there is any contamination should therefore also be understood here to mean that this memory is accessed during or after the commissioning measure. If the appropriate information is available, the signal can then also be transmitted to the driver.

In the case of a preferred embodiment of the invention, testing whether there is a contamination of the at least one exterior camera is carried out when an unlocking device or access control device of the motor vehicle is operated.

The unlocking or access control device may be, for example, a key, remote control or reader for magnetic cards, RFID elements or the like. Particularly in the case of electronic unlocking with so-called "keyless go" or "keyless entry" systems, the (possibly automatic) operation usually takes place as soon as the driver still has a certain distance from the vehicle, so that there is a particularly large amount of time left for checking for contamination.

In another preferred embodiment of the invention, the examination of whether there is any contamination of the at least one exterior camera is carried out upon contact with a door handle of the motor vehicle. This has the advantage that the exact position of the driver is known. This allows the signal to be targeted so that other road users or passers-by are disturbed or impaired as little as possible.

In another preferred embodiment of the invention, the signal to the driver comprises a visual signal transmitted by means of an external visual indicator of the motor vehicle. For this purpose, for example, an already existing display device such as a direction indicator, headlamp, logo light or the like can be used, so that the procedure does not require any additional components on the motor vehicle. Alternatively, a separate display can be provided, for example on the exterior camera itself.

In another preferred embodiment of the invention, the signal to the driver comprises an acoustic signal transmitted by means of an external acoustic indicator of the motor vehicle. For this purpose, for example, existing display devices such as a horn or a signal horn can be used, so that no additional components are necessary here either. However, it is also possible to provide separate display devices, such as an exterior speaker, which can also be located on the exterior camera in question.

In another preferred embodiment of the invention, the signal to the driver comprises a visual signal transmitted by means of a visual indicator to an operating device for the unlocking device or access control device. For example, a display can be provided on a key or on a transponder for a keyless access system. This allows the signal to be transmitted to the driver with very little interference to other people.

In another preferred embodiment of the invention, a further signal is generated when a cleaning fluid of a cleaning device of the camera has to be refilled and/or a wiper blade of the cleaning device has to be replaced. This also contributes to driving safety, as it enables the driver to ensure before the start of the journey that the existing cleaning facilities for at least one exterior camera are operational, so that no deterioration of the camera image can occur during the journey.

In another preferred embodiment of the invention, the at least one exterior camera is moved to a predetermined cleaning position in the presence of contamination. This makes it easier for the user to access the at least one exterior camera and therefore offers a particularly high level of operating comfort.

In another preferred embodiment of the invention, the opening of a door of the motor vehicle is blocked if at least one of the exterior cameras is contaminated. In this way it can be completely ensured that the vehicle can only be operated when the exterior camera is completely cleaned and in working order, so that road safety is particularly well guaranteed.

In another aspect, a motor vehicle includes at least one exterior camera and a control or regulating device which is designed to carry out a method as described.

At least one external display means can be provided for outputting the at least one signal, preferably the display means comprising at least one light, at least one microphone and/or at least one vibration generator.

A motor vehicle can also be characterized by at least one transmission device for transmitting the at least one signal to an unlocking device or access control device, at least one operating device for the unlocking device or access control device and/or at least one mobile telephone device and/or at least one smartphone.

Preferably, according to the invention, at least one external external rear view device, preferably comprising at least one external camera and/or at least one external display means.

BRIEF DESCRIPTION OF THE DRAWINGS

In the following, the invention and its embodiments are explained in more detail by means of a schematic drawing.

DETAILED DESCRIPTION

Figure 1:
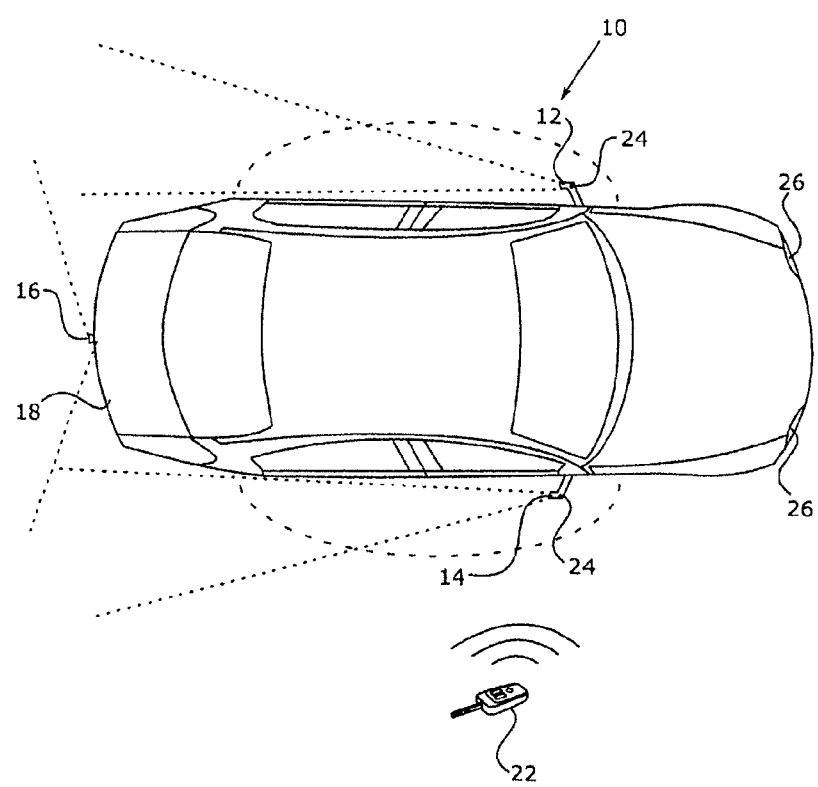
FIG. 1 is a top view of a motor vehicle according to the invention with at least one exterior camera and a key.

A motor vehicle designated 10 in FIG. 1 as a whole has two rear view cameras 12, 14, one on the driver's side and one on the passenger side of the motor vehicle 10. Another camera 16 is mounted at the rear 18 of the car 10 to provide additional visual information to the driver when reversing the car 10.

Figure 2:
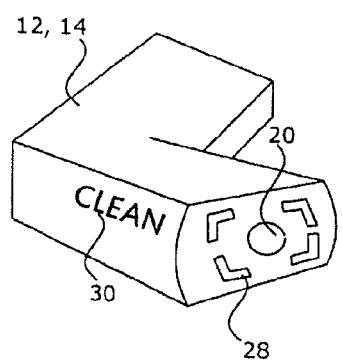
FIG. 2 is a perspective view of the exterior camera of the motor vehicle according to FIG. 1.
Figure 3:
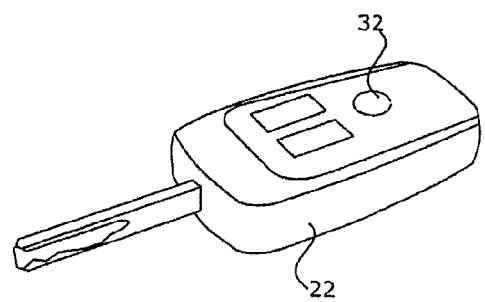
FIG. 3 is a perspective view of the key of FIG. 1.

The rear view cameras 12, 14, which are shown in detail in FIG. 2, are designed so that they can be moved between the operating position shown in FIG. 1 and a rest position in which they are recessed behind an outer paneling of the motor vehicle. The signals of the cameras 12, 14, 16 are processed by means of a data processing device and are visually displayed on corresponding displays in the interior of the motor vehicle 10 during operation of the motor vehicle 10.

The data processing equipment is able to detect by means of common image processing or image evaluation methods if a lens 20 of one of the cameras 12, 14, 16 is contaminated. The presence of contamination requiring cleaning is recognised in a known manner by a predetermined degree of contamination and/or the presence of a predetermined type of contamination. If such a contamination is detected, a corresponding information can be stored in a memory of the data processing equipment.

If it is recognised that the driver is planning to start up the motor vehicle 10, for example by operating a transponder or key 22, or even just by touching a door handle of the motor vehicle 10, the invention checks whether there is (predetermined) contamination. This can be done by querying the named memory. However, it is also possible to carry out a direct detection of contamination of lens 20 by image processing only at this point.

In the event of contamination, a signal is given to the driver to advise him that the lens 20 should be cleaned before he opens a door of the motor vehicle 10 or takes a seat in it. This can be done visually, for example, by a turn signal 24 located in one of the rear view cameras 12, 14 or by a headlight 26 of the motor vehicle 10. It is also possible to attach additional indicators to the vehicle, for example on a door handle or hubcap.

The optical signal can appear in different colours depending on the degree of contamination, whereby red can be used for "dirty" and green for "clean".

As shown in FIG. 2, the cameras 12, 14, 16 themselves may also be equipped with display elements, for example in the form of flashing or flashing lights 28 in the area of the lens 20, which may, for example, light up in different colours, or in the form of a flashing lettering 30, which prompts the driver to clean. An indicator light 32 can also be attached to the key 22 or a transponder to inform the driver accordingly.

The colours and lettering can be or become individualized, so that each driver receives the most appealing configuration.

In addition or alternatively, an acoustic signal can also be output. This can be done, for example, via an exterior loudspeaker of the motor vehicle 10, via its horn or via a loudspeaker or buzzer in the key 22 or via a smartphone. In the same way, a vibration alarm can be given to the Key 22 or even to the smartphone or other mobile phone equipment.

The driver is thus requested to clean the lens 20 before starting the journey in order to ensure safe operation of the vehicle 10. For this purpose, a cleaning element, for example a brush, a cleaning cloth, a wiper lip, a cleaning spray or the like, can be integrated into the key 22. It is also possible to provide a storage compartment for such a cleaning element in a housing or near the camera 12, 14, 16, so that the cleaning element is quickly and easily at hand.

To make cleaning easier, the camera 12, 14, 16 can also move to a preset cleaning position, for example to make the lens 20 more accessible to the driver and make cleaning more convenient.

In the described way, an additional signal can also be output if an existing cleaning system for one of the cameras 12, 14, 16 requires maintenance and, for example, requires new cleaning fluid or the replacement of a wiper blade.

It is also possible that, after detection of contamination of the lens 20, a door of the motor vehicle may be blocked until the contamination is removed, thus ensuring that the driver has to clean the lens 20 before starting the journey.

All in all, this creates a procedure and a motor vehicle 10 which enables particularly comfortable and safe operation of the motor vehicle 10.

The features of the invention disclosed in the foregoing description, claims and drawings may, either individually or in any combination, be essential for the realisation of the invention in its various embodiments.

REFERENCE SIGN

10 Motor vehicle
12 rear view camera
14 rear view camera
16 Camera
18 Rear
20 Lens
22 Key
24 Turn signal
26 Headlight
28 Lamp
30 Lettering
32 Information light

What is claimed is:

1. A method for operating a motor vehicle with at least one exterior camera, comprising:
   recognizing whether the motor vehicle is to be put into operation before a driver gets into the motor vehicle by positive recognition of:
      determining, before the driver enters the motor vehicle, whether there is contamination with at least one of a predetermined degree of contamination or a p redetermined type of contamination of the at least one exterior camera; and
   emitting at least one signal which, if the contamination is present, prompts the driver to clean the at least one exterior camera before the driver opens a door of the motor vehicle or takes a seat in the motor vehicle,
   wherein the at least one signal includes at least one first signal that is output via at least one external display means of the motor vehicle,
   wherein at least one external rear view device comprises the at least one external display means, and
   wherein at least one function of the motor vehicle including one or more of opening a door or driving off is blocked in case of certain contamination and detected start-up.

2. The method according to claim 1, further comprising triggering the contamination determination automatically or reading out of a memory a previously performed contamination determination, by at least one of:
   operating an unlocking device or access control device of the motor vehicle;
   touching a door handle of the motor vehicle;
   preheating or defrosting at least part of the motor vehicle; and
   one or more of unfolding or extending a rear view device.

3. The method according to claim 2, wherein the contamination determination is also performed by or can be triggered by at least one of:
   expiration of a time period;
   consumption of a certain amount of fuel of the motor vehicle;
   detection of a certain distance travelled by the motor vehicle; and
   recording of certain weather conditions.

4. The method according to claim 1, wherein at least one degree of contamination is determined during the contamination determination by comparison with stored data.

5. The method according to claim 1, wherein the at least one signal comprises at least one of a visual, acoustic, or vibration signal, wherein the at least one signal is at least one of selected, changed, or stored.

6. The method according to claim 1, further comprising:
   controlling of a cleaning device of at least one exterior camera in case of certain contamination and detected start-up.

7. The method according to claim 1, further comprising controlling of a movement device of the at least one exterior camera in case of certain contamination and detected start up.

8. The method according to claim 4, wherein a signal is assigned to each specific degree of contamination, whereby different signals differ in at least one of intensity, frequency, timing, length, color, or place of dispatch.

9. The method according to claim 1, wherein at least one of
   at least one second signal is output via an operating device for the unlocking device or access control device; or
   at least one third signal is output via one or more of a mobile telephone device or a smartphone.

10. The method according to claim 9, wherein the indicating element is an indicator light on a key or transponder.

11. The method according to claim 1, wherein at least a second signal is generated when one or more of a lack of cleaning fluid of a cleaning device or damage to at least part of the cleaning device is detected.

12. A motor vehicle with at least one external rear view device, comprising
   at least one external display means;
   at least one exterior camera, and a control or regulating device which is configured to perform a method, comprising:
recognizing whether the motor vehicle is to be put into operation before a driver gets into the motor vehicle by positive recognition of:
determining, before the driver enters the motor vehicle, whether there is contamination with at least one of a predetermined degree of contamination or a predetermined type of contamination of the at least one exterior camera; and
emitting at least one signal which, if the contamination is present, prompts the driver to clean the at least one exterior camera before the driver opens a door of the motor vehicle or takes a seat in the motor vehicle,
wherein the ate least one signal includes at least one first signal that is output via at least one external display means of the motor vehicle,
wherein at least one external rear view device comprises the at least one external display means, and
wherein at least one function of the motor vehicle including one or more of opening a door or driving off is blocked in case of certain contamination and detected start-up.

13. The motor vehicle of claim 12, wherein the display means comprises one or more of at least one light, at least one microphone, or at least one vibration generator.

14. The motor vehicle according to claim 12, further comprising:
at least one transmission device for transmitting the at least one signal to at least one of:
an unlocking device or access control device,
at least one operating device for the unlocking device or access control device, or
one or more of at least one mobile telephone device or at least one smartphone.

15. The motor vehicle according to claim 12, wherein the at least one external rear view device comprises an external camera.

* * * * *